UNITED STATES PATENT OFFICE.

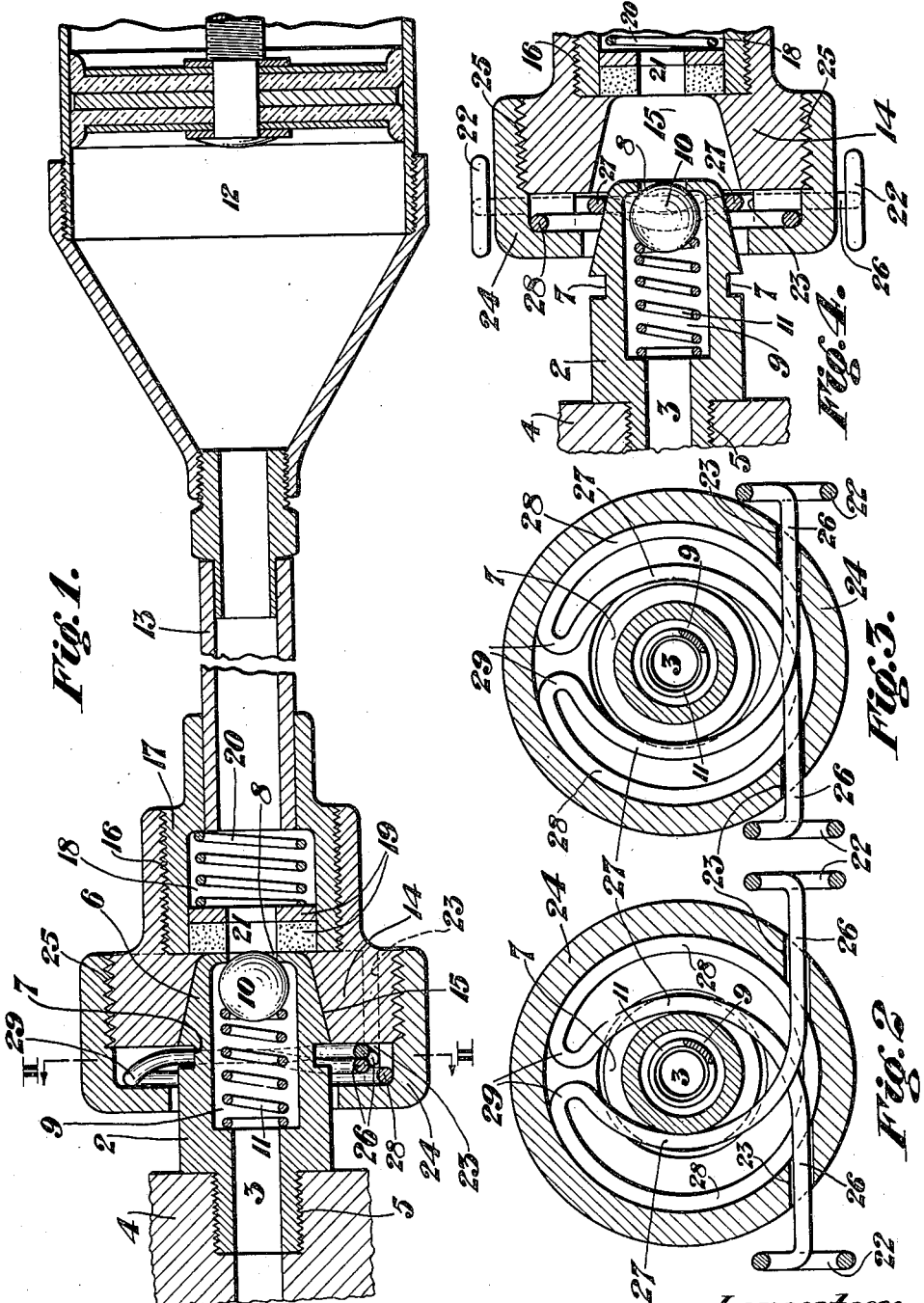

WILLIAM W. MARTIN, OF PITTSBURGH, PENNSYLVANIA.

LUBRICATOR.

1,369,687.

Specification of Letters Patent.   Patented Feb. 22, 1921.

Application filed October 4, 1919.  Serial No. 328,483.

*To all whom it may concern:*

Be it known that I, WILLIAM W. MARTIN, a citizen of the United States, residing at Pittsburgh, in the county of Allegheny and State of Pennsylvania, have invented certain new and useful Improvements in Lubricators, of which the following is a specification.

My invention consists of an improvement in lubricating devices, and has for its object to provide means for easily and quickly applying a lubricant, as grease, to any point of use, by means of a separable supply device, as a force pump, and a fixedly connected inlet conduit. The device is particularly adapted to the application of lubricants to points of application or use which require frequent lubrication, such as transmission or differential cases, spring bolts of automobiles, trucks, etc., and which are usually located at points remote from any fixed reservoir or at points which are difficult to reach.

The improvement in its entirety consists of a fixedly connected nipple having a central supply opening and a closing valve, and a force pump terminal adapted for easy connection and disconnection in the manner more fully hereinafter described.

In the drawing showing one preferred embodiment of the invention,

Figure 1 is a longitudinal sectional view of the invention, partly broken away;

Fig. 2 is a cross section on the line II—II of Fig. 1;

Fig. 3 is a similar view showing the retaining spring in opened position; and

Fig. 4 is a partial sectional view similar to Fig. 1 illustrating the operation of connecting the separable parts.

In the drawings, 2 is the grease receiving nipple, provided with a central opening 3 extending into any receiving cavity in member 4, to which the nipple 2 is connected by screw threads 5. The main body portion of the nipple is cylindrical and is provided with a forwardly tapering terminal 6, between which and the portion 2 is an annular ring groove 7 for engagement with the spring clamp, hereinafter described. At its outer portion, the tapered terminal 6 is rounded as shown, and is provided with a central terminal opening 8 leading into an enlarged interior chamber 9 within which is inclosed the valve ball 10. A light seating spring 11 is inserted between the ball and the rear shouldered portion of chamber 9 so as to normally seal the opening 8.

The opening 9 of nipple 2 is originally uniform clear to the outer end, allowing for the insertion of the spring and ball valve, after which the comparatively thin terminal is peened over, providing the ball-retaining annular lip and the reduced opening, as shown.

For the purpose of supplying lubricant at sufficient pressure through opening 8 to compress and pass around valve 10 into and through opening 3, any suitable supply mechanism or reservoir may be used, as a force pump 12, of any suitable construction. A conduit 13 thereof leads to the central interior of supply head 14, having at its front portion a centrally tapered socket 15 adapted to fit snugly over the tapered terminal 6, as in Fig. 1. The rear portion of head 14 is connected in any suitable manner as by threads 16 with a head 17, having a central enlarged opening 18, and one or more packing gaskets or washers 19. Between these and the rear shouldered portion of opening 19 is a cushioning spring 20 adapted to exert forward compression on the packing gaskets at all times against their shouldered bearing around the rear portion of socket 15. The gaskets are provided with a central reduced circulation opening 21 adapted to register with opening 8 of nipple 6, which opening is of less diameter than the interior of conduit 13 and of chamber 18.

For the purpose of fixedly connecting and disconnecting the lubricant supplying head 14 with nipple 2, when brought together as in Fig. 1, I utilize the spring holding mechanism illustrated in the drawings, particularly in Figs. 2 and 3. This consists of a resilient wire bent in the manner shown, provided with finger engaging terminals 22—22 extending outwardly through suitable openings 23 at the lower opposite sides of a cap 24, which is screwed by threads 25 upon the outer portion of head 14. The spring wire members 26—26 extend inwardly from each terminal 22 through openings 23, and are then curved around in opposite directions, one at each side of nipple 2, as at 27, and through the opposite sides of groove 7, against which they bear with considerable spring pressure, exerted through the main annular coil 28. As shown, such coil is nested around almost the entire cylindrical space within cap 24 and is abruptly bent at each corner 29 and merged into the grasping side portions 27, as shown.

When in such position, the interfitting parts 2 and 14 are held fixedly together during the operation of supplying the lubricant, and when the terminals 22 are compressed inwardly, as in Fig. 3, the entire head 14 may be withdrawn and separated from the receiving nipple. Owing to the taper of the forward terminal 6, head 14 is easily applied by merely pushing inwardly, the spring locking arms 27 being automatically expanded until the coupling is made, whereupon they spring into shouldered engagement with the slots 7 and will hold the parts together until it is desired to separate them in the manner described.

In operation, lubricant being forced inwardly through conduit 13 will act first to tightly compress the somewhat resilient gaskets 19 in addition to pressure of spring 20, so as to seat them firmly against the terminal of nipple 6 with sealing force. The lubricant is then forced inwardly around valve 10 until the cavity is filled beyond opening 3 and the pressure is then released. Thereupon, valve 10 will close and the head may be disconnected for another application elsewhere.

The device is comparatively simple and composed of few parts; it enables the application of lubricant to any point within reach by merely connecting the interfitting terminals 6 and 14; it is well adapted to easy and quick application of lubricant to many points heretofore difficult of access, and insures a full and frequent supply as needed. The lubricator may be made in various sizes and capacities, and may be changed or varied in design or detail construction by the skilled mechanic, but all such changes are to be considered as within the scope of the following claims.

What I claim is:

1. In lubricating mechanism, a hollow receiving nipple having a tapered coniform valved terminal, a separable supply head having a coniform shaped receiving socket therein and a conduit connected therewith having a communicating recess provided with an open center contacting gasket, a pressure spring therefor, and laterally movable interlocking mechanism adapted to engage the nipple and hold it in communicating connection with said socket.

2. In lubricating mechanism, a hollow receiving nipple having a tapered coniform valved terminal, a separable supply head having a coniform shaped receiving socket therein and a conduit connected therewith having a communicating recess provided with an open center contacting gasket, a pressure spring therefor, laterally movable interlocking mechanism adapted to engage the nipple and hold it in communicating connection with said socket, and means connected with said conduit for supplying lubricant under pressure to said head and through the nipple.

3. In combination with a fixedly attached hollow receiving nipple having an internal spring pressed valve, an annular shouldered groove and a coniform terminal; a force pump having a conduit provided with an attaching head formed with a coniform receiving recess for said terminal, a spring-pressed centrally apertured washer across the end of the recess, an outer embracing shell inclosing an annular cavity, and a looped spring mounted therein having engaging side portions and compressing terminals extending outwardly through opposite sides of the embracing shell and provided with extended finger terminals.

4. In a detachable grease supply apparatus adapted to make temporary connection with a projecting hollow receiving nipple having an interior spring-pressed valve, an outer coniform terminal and an annular shouldered groove; the combination with a force pump, of an attaching supply head having a central coniform socket, a centrally open packing gasket in the base thereof, a pressure spring for the gasket, a communicating conduit between said head and the force pump, a hollow embracing cap for the nipple secured upon the supply head and provided with oppositely located openings, and a one piece looped wire spring having oppositely acting side portions for engagement with the groove of the receiving nipple, and inwardly movable operating terminal portions extending outwardly through the openings in the embracing cap and having finger terminals.

In testimony whereof I hereunto affix my signature.

WILLIAM W. MARTIN.